United States Patent Office 3,501,979
Patented Mar. 24, 1970

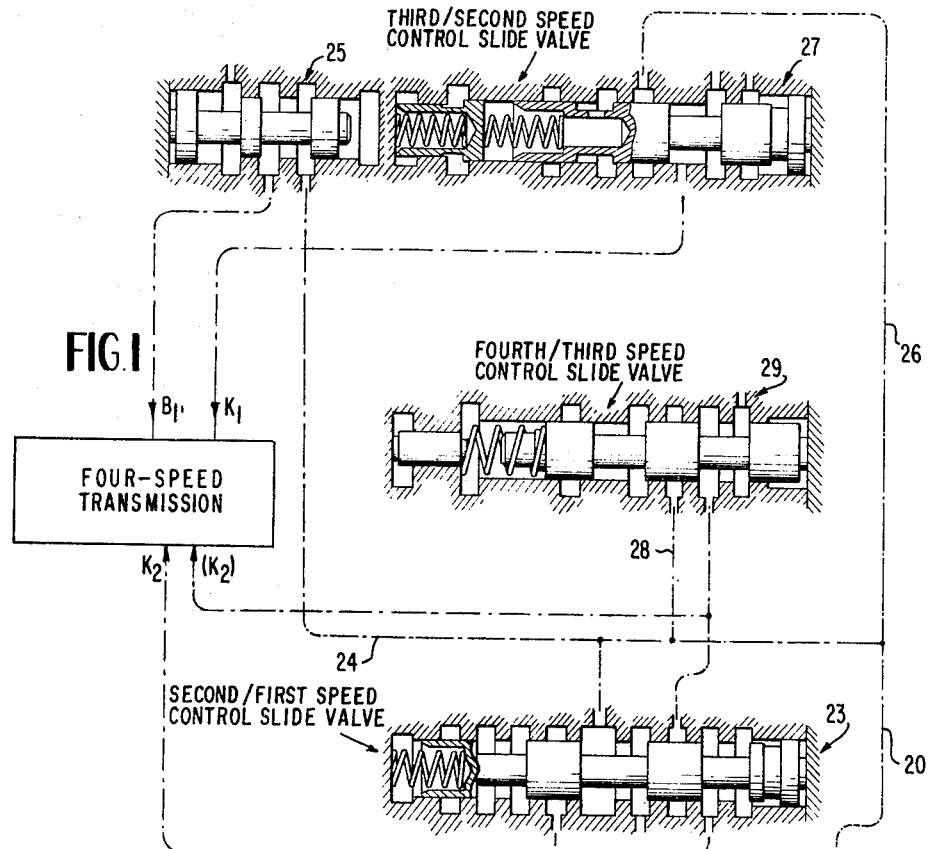
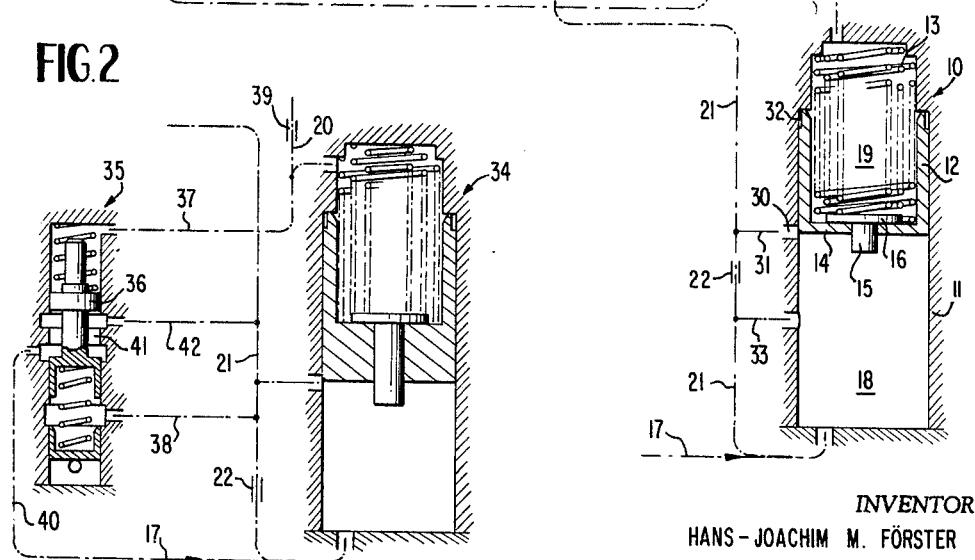

3,501,979
ARRANGEMENT FOR THE AUTOMATIC SHIFT-
ING OF A CHANGE-SPEED TRANSMISSION FOR
VEHICLES, ESPECIALLY FOR MOTOR VEHICLES
Hans-Joachim M. Forster and Ulrich Eltze, Stuttgart-
Riedenberg, Germany, assignors to Daimler-Benz
Aktiengesellschaft, Stuttgart-Unterturkheim, Germany
Filed Dec. 2, 1966, Ser. No. 598,727
Claims priority, application Germany, Dec. 4, 1965,
D 48,833
Int. Cl. F16d 11/00; F16h 3/44, 57/10
U.S. Cl. 74—753                                              25 Claims

ABSTRACT OF THE DISCLOSURE

An arrangement for the automatic shifting of a change-speed gear for vehicles, in which the individual speeds are adapted to be selectively engaged by engageable devices such as brakes or clutches actuated by a pressure medium supplied by way of slide valves, whereby the working pressure of the pressure medium is selectively supplied to the respective slide valves from a common receiver by way of the receiver discharge line to which are connected several servo devices controlling the engagement of the brakes and clutches.

The receiver piston also controls a by-pass line for a throttle in the feed line to the shifting valves. In the alternative, an additional control slide valve which is controlled by the flow in the receiver discharge line, may be connected with the receiver to control the by-pass of this throttle and also the by-pass of a measuring throttle forming part of the control of this additional control slide valve.

BACKGROUND OF THE INVENTION

The present invention relates to an arrangement for the automatic shifting of a change-speed gear for vehicles, especially of a planetary gear change-speed transmission for motor vehicles, in which the individual speeds are engaged by servo-devices actuated by a pressure medium, for example, by means of brakes or clutches to which the working pressure is supplied, controlled by control slide valves or shifting slide valves and in which receivers for the pressure medium are provided for influencing the pressure build-up in the servo-devices.

Shifting arrangements are known in the prior art in which receivers are coordinated to the servo-devices, for the most part, clutches, for the shifting-up operations of the speeds, which receivers influence the pressure build-up at the servo-device in a certain predetermined manner. A separate receiver is thereby normally coordinated to or associated with each servo-device in the prior art which naturally requires a great amount of space and involves a large amount of weight.

SUMMARY OF INVENTION

In contradistinction thereto, there always exists with such shifting arrangements the desire to effect economies both in space and weight. The present invention aims at a solution of this problem and, in particular, essentially consists in that several servo-devices are operatively connected with a common receiver. With a preferred embodiment of a motor vehicle change-speed gear having four forward speeds, the present invention proposes that the servo-devices provided for the three upper speeds are connected with the discharge line of a common receiver. Consequently, this means that lower speed or speeds are not connected with the servo-devices thereof to the common receiver.

The construction according to the present invention entails a substantial saving in space. Several servo-devices may now be influenced in the desired manner from one and the same receiver. Also, the weight of the shifting arrangement becomes smaller as one and the same receiver is utilized several times. Furthermore, the saving of further receivers is, by itself, already of significance for the reason that these receivers have to be constructed relatively large compared, for example, to some shifting and control slide valves.

The present invention prefers a solution according to which the connecting lines are conducted from the discharge line of the common receiver to the servo-devices by way of the respective control and/or shifting slide valves and are adapted to be controlled thereby. According to the present invention, the discharge line of the receiver is then connected by means of the control slide valve for the second/first speed in its position for the second speed, with the supply line of the receiver and in its position for the first speed is separated therefrom whereby a throttle is appropriately arranged in the connecting line from the inlet side of the receiver to the control slide valve for the second/first speed which throttle may possibly be adjustable. A corresponding pressure drop is produced by means of this throttle so that upon engagement of a clutch or brake, the receiver is able to supply its filling to the corresponding servo-device. It is possible thereby to influence from a single receiver all of the shifting-up operations of the transmission. The first speed is appropriately excluded from this control since it is always engaged during standstill.

Receivers are known as such in the prior art. They essentially consist in general of a cylinder in which is arranged a spring-loaded piston. According to the present invention, the supply line is now connected on the side of the receiver piston opposite the springs and the discharge line on the spring side thereof. Furthermore, it is appropriate if the receiver piston, in its end position stressing the springs, opens up the aperture of a line which in by-passing relationship to the throttle terminates in the connecting line from the supply to the control slide valve for the second/first speed. It becomes possible in this manner to by-pass the throttle during the last phase of the movement of the receiver piston and to enable a rapid filling of the servo-device.

According to a further feature and development of the inventive concept several springs are arranged in the receiver piston constructed in the manner of a plunger piston, of which some springs are supported on a separate spring plate which, together with a plunger, extends through the piston bottom. In this manner, the receiver piston is relieved in its end position, relieving the springs from a large part of the spring stress in that the plunger seats against the bottom of the receiver cylinder. Consequently, considerably weaker spring forces have to be overcome during the starting phase of the movement of the receiver piston for the filling of the servo-devices.

Shifting arrangements of the aforementioned type involve unavoidable leakage losses. The aforementioned throttle, however, can be matched naturally always only to a certain amount or magnitude of these leakage losses. In other words, this means, if the throttle bore is too small compared to the leakage losses, then the receiver piston moves much too slowly and in the extreme case, does not move at all. If, in contrast thereto, the throttle bore is too large, then the receiver piston moves too rapidly.

In order to eliminate this uncertainty, the present invention may be further developed in that the throttle in the connecting line from the receiver supply to the control slide valve for the second/first speed is adapted to be by-passed by way of a direct line to the supply and that a control slide valve is located in this by-pass line which is adapted to be controlled by the flow in the discharge line of the receiver. With this arrangement according to the present invention, the throttle can be adapted or matched without difficulty to each desired leakage oil quantity or, stated better, every desired quantity of leakage oil can be replaced and notwithstanding such replacement with a certain throttle size always the same velocity of the receiver piston can be achieved.

In connection therewith, the present invention then further proposes that a measuring throttle be located in the discharge line of the receiver and that the line upstream of this measuring throttle is connected with one side of the control slide valve and downstream of this measuring throttle with the other side of the control slide valve. The latter appropriately takes place in such a manner that the other side of the control slide valve is connected with the connecting line between the supply line and the control slide valve for the second/first speed, and more particularly downstream of the throttle in the same.

In order to prevent an excessively strong flow toward the control slide valve, the present invention additionally proposes that a throttle is also arranged in the supply line to this control slide valve which, however, has a considerably larger cross section than the throttle in the connecting line between the supply and the control slide valve.

Accordingly, it is an object of the present invention to provide a shifting mechanism for change-speed gears which avoids the aforementioned shortcomings and drawbacks encountered in the prior art arrangements.

It is another object of the present invention to provide a shifting control system of the type described above which is characterized by smaller weight and space requirements.

A further object of the present invention resides in a shifting control system for automatic change-speed transmissions of motor vehicles which assures reliable operation under all operating conditions by compensating for leakage losses without jeopardizing the proper timing of the shifting operations.

These and further objects, features, and advantages of the present invention will become more obvious from the following description when taken in connection with the accompanying drawing which shows, for purposes of illustration only, two embodiments in accordance with the present invention, and wherein:

FIGURE 1 is a partial schematic view of a shifting arrangement having a common receiver in accordance with the present invention; and FIGURE 2 is a partial schematic view of a modified embodiment of a shifting arrangement having a common receiver and control slide valve in accordance with the present invention.

In the drawing and the following description only the slide valves and lines or conduits of the shifting arrangement are taken into consideration which are directly involved in the present invention in order not to confuse the picture. Since the other components and parts of the shifting arrangement are of conventional construction, details thereof are neither illustrated nor described. While the present invention may be used with any known change-speed transmission requiring analogous shifting controls, it is assumed that a motor vehicle planetary-gear, change-speed transmission having four forward speeds is used with the present invention which transmission is provided, for purposes of shifting and engaging these four forward speeds, with two brakes B1 and B2 and with two clutches K1 and K2. The actual construction of the transmission forms no part of the present invention but may be of any type known in the prior art. However, it is assumed that the shifting operation of such transmission takes place in such a manner that in the first speed, the brake B2 is engaged, in the second speed the brakes B2 and B1 are engaged, in the third speed the brake B2 and the clutch K1 are engaged; and in the fourth speed the clutches K1 and K2 are engaged. This means, in practice, that the transmission shifts without group changes, i.e., shifting from one to the next speed merely requires a change in one of the two previously engaged engageable means while the other previously engageable means always remains engaged.

Referring now to the drawing wherein like reference numerals are used throughout the two views to designate like parts, and more particularly to FIGURE 1, the shifting arrangement illustrated in this figure includes a receiver generally designated by reference numeral 10 which is effective simultaneously for the brake B1 and the two clutches K1 and K2. A receiver piston 12 is arranged within the housing 11 of the receiver 10 which piston is supported on one side thereof by one or several springs 13 with respect to the housing 11. A plunger 15 is disposed in the bottom 14 of the receiver piston 12 which extends through the bottom 14 and is provided with a disk or plate 16, against which are supported one or two inner ones of the several springs 13. This has the purpose that in the other, non-illustrated end position of the receiver piston 12, only the outermost spring, i.e., a considerably weaker spring force is effective.

The pressure medium is supplied to the receiver 10 by way of the supply line 17 from a conventional regulating slide valve (not illustrated) for the working pressure. A pre-selector slide valve of conventional construction (not shown) is additionally coordinated to or associated with the regulating slide valve. The supply line 17 terminates on the side 18 of the receiver piston 12 opposite the springs 13. The other side 19 accommodating the springs 13 is connected with the discharge line 20. A further line 21 leads from the supply line 17 by way of a throttle 22 to the shifting control slide valve generally designated by reference numeral 23 for the second/first speed. The line 21 is connected by means of this shifting control slide valve 23 in the other non-illustrated end-position thereof —which corresponds to the second speed—with the discharge line 20 of the receiver 10.

From the last-mentioned discharge line 20 of the receiver 10 extend the lines to the individual servo-devices. In particular, a line 24 leads by way of the shifting slide valve generally designated by reference numeral 25—which is illustrated in its position corresponding to the second speed—to the clutch K1. Finally, a line 28 leads by way of a shifting control slide valve generally designated by reference numeral 27 for the third/second speed—which is also illustrated in its position for the second speed —to the clutch K1. Finally, a line 28 leads by way of the shifting control slide valve generally designated by reference numeral 29 for the fourth/third speed—which is in its position for the third speed—to the clutch K2. This last-mentioned line 28, in the illustrated embodiment, extends by way of the shifting control slide valve 23 for the second/first speed. This has the purpose to enable a braking in the first speed. In principle, the line leading to the clutch K2 may be branched-off directly from the shifting control slide valve 29 ahead of the shifting control slide valve 23.

The position of the shifting devices in FIGURE 1 corresponds to the position "First Speed." The shifting into second speed takes place by a shifting of the control slide valve 23 into its other end position. This is obtained in a conventional known manner by applying a pressure to the corresponding actuating face thereof as is well known. As a result thereof, the oil supply from line 17 to line 24 and therewith to brake B1 and also to line 20 and therewith to the space 19 of the receiver 10 is opened by way of the lower receiver section 18 and line 31 as well as line 21. At first—by reason of the slight resistance to movement—the piston of brake B1 is displaced into the shifting or engaging position. As soon as this is achieved and the oil flow in line 24 ceases, the pressure downstream of the throttle 22 increases to such an extent that the receiver piston 12 starts to move in the downward direction. After closure of the lateral bore 30, the further supply can take place only by way of the throttle 22 so that a sufficiently long period of operation of the movement of the receiver piston 12 is assured which is sufficiently long for a soft and smooth engagement of the brake band of brake B1. In the lower end position of the receiver piston 12, the edge of 32 opens up the line 33 as by-pass of the throttle 22 in order that leakage losses may be compensated for downstream of the line 21 without pressure loss.

The engagement of the second speed is thereby completed, the receiver 10 is filled in its lower position and is available again for further shifting operations. If now the control slide valve 27 for the third/second speed is shifted in a conventional manner to its other end position, then the line 26 to the clutch K1 is opened up. While the clutch piston of clutch K1 is set into motion, the pressure in line 26 and therewith also in line 20 decreases strongly. This has as a consequence that the receiver piston 12 starts to move under the full pressure in the space 18 against the springs 13. After closing of line 33, the oil supply can take place from line 17 only by way of the throttle 22 so that the receiver 10 displaces the oil out of the space 19 by way of lines 20 and 26 into the clutch K1. If the receiver piston has reached the end position thereof, then the remaining filling of clutch K1 takes place in an unthrottled manner by way of the now-opened line 31. As soon as the clutch K1 is filled and therewith the pressure in lines 26 and 20 increases, the receiver piston 12 again starts to move downwardly and the further operation is exactly the same as with the shifting operation described above for the second speed. The brake B1 is disengaged in third speed in a conventional manner not illustrated herein and for that purpose the shifting slide valve 25 is shifted into its other, non-illustrated end position.

During shifting of the control slide valve 29 for the fourth/third speed into its other non-illustrated end position, the line 28 to the clutch K2 is opened up. In principle, the same operation repeats itself at the receiver again. In the fourth speed, the brake B2—which is engaged in the first three speeds—is disengaged in a conventional manner not illustrated herein so that in the fourth speed both clutches K1 and K2 are engaged.

According to FIGURE 2, the receiver generally designated by reference numeral 34 and all other control and shifting slide valves are constructed in principle in the same manner as heretofore. An auxiliary control slide valve generally designated by reference numeral 35 is coordinated to the receiver 34. The control slide valve 35 has the purpose to enable a regulated and controlled supply or flow of the pressure medium during the occurrence of leakage losses. Otherwise, the throttle 22 would have to be dimensioned in a predetermined manner which, however, is possible only for a predetermined magnitude of the leakage losses.

On the one hand, a line 37 acts on the control slide valve piston 36 which line 37 is connected with the discharge line 20 of the receiver 34. A line 38 acts on the other side of the piston 36 which is in communication with the line 21. A measuring throttle 39 is additionally inserted into the discharge line 20. The supply line 17 is connected by way of a line 40 with the center space 41 of the control slide valve piston 36. A further line 42 leads from the center space 41 directly into the line 21 so that in this manner the throttle 22 is by-passed.

The pressure drop at the measuring throttle 39 acts, inter alia, as regulating or control magnitude on the control slide valve piston 36. If such a pressure drop does not exist then the piston 36 is in its center position so that with an open line 40/41 all leakage losses can be covered without pressure drop by way of this line. If the receiver piston moves downwardly, then the pressure in line 21 is larger than in line 20 behind the throttle 39. Consequently, the control slide valve piston 36 moves up- wardly and throttles the line 40 to such an extent that the flow through the measuring throttle 39 assumes the required value and the predetermined velocity of the receiver piston is adjusted thereby.

If the receiver piston moves upwardly—when the line leading to a clutch is opened—then the reverse pressure conditions occur at the control slide valve piston 36, i.e., the latter moves downwardly. As a result thereof, firstly the supply 40 is closed off again and secondly, after a further movement, a connection between the lines 37 and 42 is established so that the receiver 34 can expel its volume into the clutch in by-pass to the measuring throttle 39. It is also feasible in connection therewith to insert a throttle into the line 40 which, naturally, would have to be larger than the throttle 22. As to the rest, the operation of the embodiment of FIGURE 2 is the same as that described in connection with FIGURE 1.

While we have shown and described two embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:
1. A shifting arrangement for automatically shifting change-speed transmissions of vehicles, especially motor vehicles, comprising a plurality of servo-means actuated by a pressure medium for engaging the individual speeds of the transmission including engageable means, conduit means for supplying the pressure medium to said engageable means including control slide valve means, and means for influencing the pressure build-up in the servo-means including receiver means for the pressure medium, several of said servo-means being operatively connected with a common receiver means, the change-speed transmission having four forward speeds, said common receiver means having a discharge line, and the servo-means for the second, third, and fourth speeds being connected with the discharge line of the common receiver means, said conduit means including connecting line means for connecting the discharge line of the common receiver means with said servo-means, said connecting line means extending by way of and being controlled by said control slide valve means, the discharge line of the common receiver means being connected by way of the control slide valve means for the second/first speed in its position for the second speed with the supply line of the receiver means and is separated therefrom in a position for the first speed of said control slide valve means for the second/first speed.

2. A shifting arrangement according to claim 1, further comprising throttle means arranged in the connecting line of said conduit means extending from the supply side of the receiver means to the control slide valve means for the second/first speed.

3. A shifting arrangement according to claim 2, wherein said throttle means is adjustable.

4. A shifting arrangement according to claim 2, further comprising a supply line, a receiver piston in said common receiver means, spring means arranged on one side of said receiver piston, the supply line being connected on the side of the receiver piston opposite the spring means and the discharge line on the spring side thereof.

5. A shifting arrangement according to claim 4, wherein the receiver piston opens up in its end position relieving the spring means the aperture of a line which, in by-passing relationship to the throttle means, terminates in the connecting line from the supply line to the control slide valve means for the second/first speed.

6. A shifting arrangement according to claim 5, wherein said receiver piston is constructed in a plunger-piston-like manner and several springs are arranged therewithin, a spring plate having a plunger extending through the piston bottom, a portion of said springs being supported on said spring plate.

7. A shifting arrangement according to claim 6, wherein the throttle means in the connecting line from the supply line to the control slide valve means for the second/first speed is adapted to be by-passed by a direct line to the supply line, and auxiliary control slide valve means in said by-pass line, and means for controlling said auxiliary control slide valve means by the flow in the discharge line of the common receiver means.

8. A shifting arrangement according to claim 7, further comprising measuring throttling means in the discharge line of the common receiver means, said auxiliary control slide valve means being provided with slide valve piston means, the discharge line upstream of the measuring throttling means being connected with one side of the slide valve piston means and downstream of said measuring throttling means with the other side of the slide valve piston means.

9. A shifting arrangement according to claim 8, wherein the other side of the slide valve piston means is connected with the connecting line between the throttling means and the control slide valve means for the second/first speed.

10. A shifting arrangement according to claim 9, comprising further throttle means on the supply side of said by-pass line to the auxiliary slide valve means, said further throttle means having a substantially larger cross section than the throttling means in the connecting line between the supply line and the control slide valve means for the second/first speed.

11. A shifting arrangement for automatically shifting change-speed transmissions of vehicles, especially motor vehicles, comprising a source of pressure medium, a plurality of servo-means actuated by the pressure medium for engaging the individual speeds of the transmission including engageable means, conduit means for supplying the pressure medium to said engageable means, control slide valve means in said conduit means including a control slide valve means for the second/first speed, and means for influencing the pressure build-up in the servo-means including receiver means having a supply side and a discharge side, several of said servo-means being operatively connected with a receiver space of substantial volume on the discharge side of the common receiver means, and said conduit means including a connecting line extending from the supply side of the receiver means to the control slide valve means for the second/first speed and including throttle means, the throttle means in the connecting line from the supply line to the control slide valve means for the second/first speed being adapted to be by-passed by a direct line to the supply line, auxiliary control slide valve means in said by-pass line, and means for controlling said auxiliary control slide valve means by the flow in the discharge line of the common receiver means.

12. A shifting arrangement according to claim 11, further comprising measuring throttling means in the discharge line of the common receiver means, said auxiliary control slide valve means being provided with slide valve piston means, the discharge line upstream of the measuring throttling means being connected with one side of the slide valve piston means and downstream of said measuring throttling means with the other side of the slide valve piston means.

13. A shifting arrangement according to claim 12, wherein the other side of the slide valve piston means is connected with the connecting line between the throttling means and the control slide valve means for the second/first speed.

14. A shifting arrangement according to claim 13, comprising further throttle means on the supply side of said by-pass line to the auxiliary slide valve means, said further throttle means having a substantially larger cross section than the throttling means in the connecting line between the supply line and the control slide valve means for the second/first speed.

15. A shifting arrangement according to claim 11, comprising further throttle means on the supply side of said by-pass line to the auxiliary slide valve means, said further throttle means having a substantially larger cross section than the throttling means in the connecting line between the supply line and the control slide valve means for the second/first speed.

16. A shifting arrangement for automatically shifting change-speed transmissions of vehicles, especially motor vehicles, comprising a source of pressure medium, a plurality of servo-means actuated by the pressure medium for engaging the individual speeds of the transmission including engageable means, conduit means for supplying the pressure medium to said engageable means, control slide valve means in said conduit means including a control slide valve means for the second/first speed, and means for influencing the pressure build-up in the servo-means by the movements of a piston in a receiver means having a supply side and a discharge side separated from said supply side by the movable piston, several of said servo-means being operatively connected with a receiver space of substantial volume on the discharge side of the common receiver means to replenish pressure medium from said space during movement of the piston in one direction, and conduit means including a connecting line extending from the supply side of the receiver means to the control slide valve means for the second/first speed and including throttle means controlled by movements of said piston, said piston having a sufficiently long piston stroke to assure smooth engagement of the speeds during movement in the opposite direction while said throttle means is effective.

17. A shifting arrangement for automatically shifting change-speed transmissions of vehicles, especially motor vehicles, comprising a plurality of servo-means actuated by a pressure medium for engaging the individual speeds of the transmission including engageable means, conduit means for supplying the pressure medium to said engageable means including control slide valve means, and means for influencing the pressure build-up in the servo-means including common receiver means for the pressure medium, several of said servo-means being operatively connected with a receiver space of substantial volume in the common receiver means to store therein pressure medium to be supplied to the servo-means during engagement, a pressure medium supply line, a receiver piston in said common receiver means, spring means arranged on only one side of said receiver piston, the supply line being connected on the side of the receiver piston opposite the spring means, and said conduit means forming a discharge line for said common receiver means which is connected thereto on the spring side thereof, said receiver piston influencing said pressure build-up by supplying a significant amount of pressure medium stored in the receiver space of the common receiver means to the servo-means during movement in one direction opposite the force of the spring means and by continuing a control influence on the servo-means during movement in the opposite direction.

18. A shifting arrangement according to claim 17, further comprising throttle means, a connecting line from the supply line to the control slide valve means for the second/first speed, a line provided with an aperture and in by-passing relationship to the throttle means, the receiver piston opening up in its end position relieving the spring means said aperture, and the line provided with said aperture terminating in the connecting line.

19. A shifting arrangement according to claim 18, wherein said receiver piston is constructed in a plunger-piston-like manner and several springs are arranged therewithin, a spring plate having a plunger extending through the piston bottom, a portion of said springs being supported on said spring plate.

20. A shifting arrangement according to claim 17, wherein said receiver piston is constructed in a plunger-piston-like manner and several springs are arranged therewithin, a spring plate having a plunger extending through the piston bottom, a portion of said springs being supported on said spring plate.

21. A shifting arrangement for automatically shifting change-speed transmissions of vehicles, especially motor vehicles, comprising a source of pressure medium, a plurality of servo-means actuated by the pressure medium for engaging the individual speeds of the transmission including engageable means, conduit means for supplying the pressure medium to said engageable means including control slide valve means, and means for influencing the pressure build-up in the servo-means including receiver means with receiver cylinder and piston means and throttle means controlled by said piston means for throttling the supply of pressure medium from said source for a predetermined time and simultaneously supplying pressure medium from the cylinder means thereof by displacement of its piston means during at least a substantial part of the predetermined time, said cylinder means forming a variable cylinder space of substantial volume to store therein pressure medium, discharge line means connected to said space in such a manner that during said predetermined time only said discharge line means is connected with said space, the side of said piston means opposite said space being subjected to the pressure of said pressure medium from said source, and several of said servo-means being operatively connected with a common receiver means.

22. A shifting arrangement for automatically shifting change-speed transmissions of vehicles, especially motor vehicles, comprising a plurality of servo-means actuated by a pressure medium for engaging the individual speeds of the transmission including engageable means, conduit means for supplying the pressure medium to said engageable means including control slide valve means, and means for influencing the pressure build-up in the servo-means including receiver means for the pressure medium, several of said servo-means being operatively connected with a common receiver means, the change-speed transmission having four forward speeds, said common receiver means having a discharge line, and the servo-means for the second, third, and fourth speeds being connected with the discharge line of the common receiver means, said common receiver means forming a receiver space of substantial volume on one side of its piston means and an actuating space in communication with the pressure medium on the other side of the piston means, and said receiver space being connected during movement of said piston means only with the discharge line of the common receiver means.

23. A shifting arrangement according to claim 22, wherein said conduit means include connecting line means for connecting the discharge line of the common receiver means with said servo-means, said connecting line means extending by way of and being controlled by said controlled slide valve means.

24. A shifting arrangement according to claim 21, wherein said conduit means include connecting line means for connecting the discharge line means of the common receiver means with said servo-means, said connecting line means extending by way of and being controlled by said control slide valve means.

25. A shifting arrangement for automatically shifting change-speed transmissions of vehicles, especially motor vehicles, comprising a source of pressure medium, a plurality of servo-means actuated by the pressure medium for engaging the individual speeds of the transmission including engageable means, conduit means for supplying the pressure medium to said engageable means including control slide valve means, and means for influencing the pressure build-up in the servo-means including receiver means with receiver cylinder and piston means for throttling the supply of pressure medium from said source for a predetermined time and simultaneously supplying pressure medium from the cylinder means thereof by displacement of its piston means during at least a substantial part of the predetermined time, several of said servo-means being operatively connected with a common receiver means by way of a discharge line, a supply line, a receiver piston in said common receiver means separating said supply line from said discharge line, spring means arranged on only one side of said receiver piston, the supply line being connected to said common receiver means on the side of the receiver piston opposite the discharge line which is connected on the spring side thereof.

References Cited

UNITED STATES PATENTS

| | | | |
|---|---|---|---|
| 3,000,230 | 9/1961 | Froslie | 74—869 |
| 3,362,261 | 1/1968 | Snyder et al. | 74—864 |
| 2,828,642 | 4/1958 | Bernard. | |
| 2,998,732 | 9/1961 | Nelson | 74—364 |
| 3,008,349 | 11/1961 | Winchell et al. | 74—688 |
| 3,053,116 | 9/1962 | Christenson et al. | 74—752 |
| 3,101,011 | 8/1963 | Tuck et al. | 74—732 |
| 3,106,273 | 10/1963 | Doerfer et al. | 192—4 |
| 3,180,173 | 4/1965 | Fisher et al. | |
| 3,255,642 | 6/1966 | Christenson et al. | 74—645 |
| 3,274,858 | 9/1966 | Meyer et al. | 74—761 |

DONLEY J. STOCKING, Primary Examiner

T. C. PERRY, Assistant Examiner

U.S. Cl. X.R.

74—869; 192—109